United States Patent
Li et al.

(10) Patent No.: US 8,307,511 B2
(45) Date of Patent: *Nov. 13, 2012

(54) SWIVEL-HINGE ASSEMBLY WITH ROTATION LIMITING PEG

(75) Inventors: Xiao-Bo Li, Shenzhen (CN); Han-Zheng Zhang, Shenzhen (CN); Shen Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 262 days.

This patent is subject to a terminal disclaimer.

(21) Appl. No.: 12/651,783

(22) Filed: Jan. 4, 2010

(65) Prior Publication Data

US 2011/0099758 A1  May 5, 2011

(30) Foreign Application Priority Data

Oct. 30, 2009  (CN) .......................... 2009 1 0309174

(51) Int. Cl.
 *E05D 3/10* (2006.01)
 *E05D 11/08* (2006.01)
(52) U.S. Cl. ................. 16/367; 16/337; 16/342
(58) Field of Classification Search .................. 16/367, 16/386, 338–340, 330, 303, 380, 334; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| | | | | |
|---|---|---|---|---|
| 5,970,580 A | * | 10/1999 | Katoh | 16/337 |
| 6,018,847 A | * | 2/2000 | Lu | 16/337 |
| 6,671,929 B1 | * | 1/2004 | Lu | 16/342 |
| 7,380,313 B2 | * | 6/2008 | Akiyama et al. | 16/367 |
| 7,409,746 B2 | * | 8/2008 | Lu et al. | 16/367 |
| 7,513,014 B2 | * | 4/2009 | Lin | 16/374 |
| 2003/0163900 A1 | * | 9/2003 | Rude et al. | 16/337 |
| 2004/0049887 A1 | * | 3/2004 | Lu | 16/342 |
| 2005/0204509 A1 | * | 9/2005 | Lin et al. | 16/342 |
| 2006/0021195 A1 | * | 2/2006 | Yamada et al. | 16/367 |
| 2006/0048377 A1 | * | 3/2006 | Shirai et al. | 29/732 |
| 2006/0265839 A1 | * | 11/2006 | Lu | 16/342 |
| 2007/0157433 A1 | * | 7/2007 | Lu et al. | 16/342 |
| 2008/0168624 A1 | * | 7/2008 | Chien | 16/367 |
| 2009/0007384 A1 | * | 1/2009 | Lin | 16/375 |
| 2011/0141737 A1 | * | 6/2011 | Gu et al. | 362/249.1 |

FOREIGN PATENT DOCUMENTS

| | | |
|---|---|---|
| CN | 101463863 A | 6/2009 |
| CN | 201314328 Y | 9/2009 |
| JP | 11247837 A  * | 9/1999 |

* cited by examiner

*Primary Examiner* — Chuck Y. Mah
(74) *Attorney, Agent, or Firm* — Altis Law Group, Inc.

(57) ABSTRACT

A swivel-hinge assembly includes a main plate, a knuckle on the main plate, a first pivot shaft rotatably engaged in the knuckle, at least one end of the first pivot shaft exposed out of the knuckle and a peg positioned on the end of the first pivot shaft exposed out of the knuckle. The peg includes a limiting portion protruding out of the first pivot shaft and abutting an edge of the knuckle, wherein when the first pivot shaft is rotated and reaches a predetermined position the limiting portion of the peg abuts the main plate thereby preventing further rotation of the first pivot shaft.

9 Claims, 2 Drawing Sheets

SWIVEL-HINGE ASSEMBLY WITH ROTATION LIMITING PEG

BACKGROUND

1. Technical Field

The present disclosure relates to swivel-hinge assemblies and, particularly, to a swivel-hinge assembly having a simple structure.

2. Description of the Related Art

A typical swivel-hinge assembly used in an electronic device includes a main plate, a knuckle, a shaft, a limiting member, and a nut. The shaft forms a threaded portion at one end. The knuckle is fixed on the main plate. The shaft is inserted in the knuckle, and the threaded portion of the shaft is exposed out of the knuckle. The nut threadedly engages with the threaded portion. The limiting member is fixed on the other end of the shaft away from the threaded portion to rotatably fix the shaft in the knuckle. The knuckle has a stopping portion formed thereon. The limiting member has a limiting protrusion, which is blocked by the stopping portion when the shaft rotates. Thus, a rotation angle of the shaft relative to the knuckle is limited.

However, the swivel-hinge assembly has a large number of components which form a complex structure. Thus assembling and disassembling the swivel-hinge assembly are troublesome.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
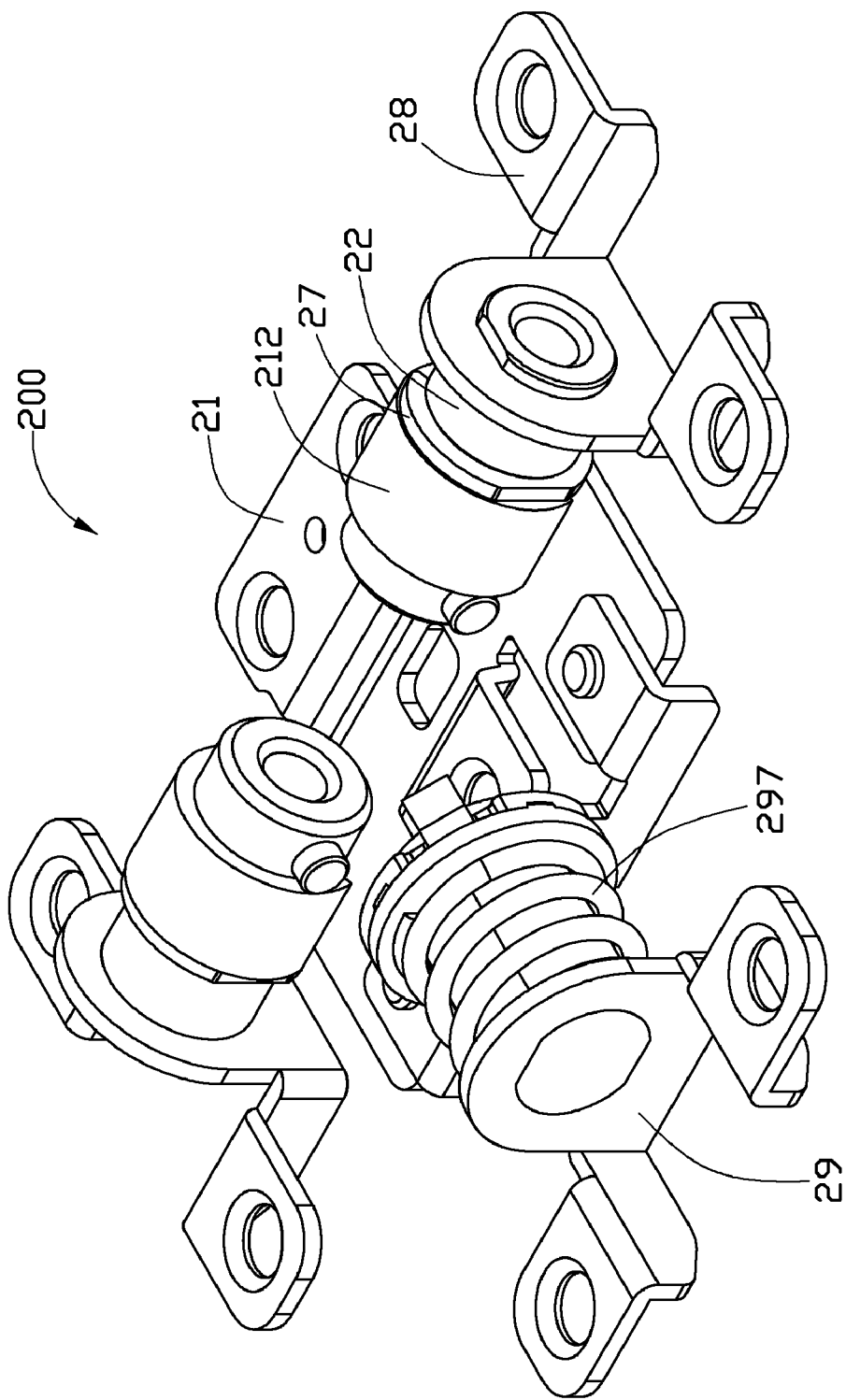
FIG. 1 is an isometric view of an embodiment of a swivel-hinge assembly.
Figure 2:
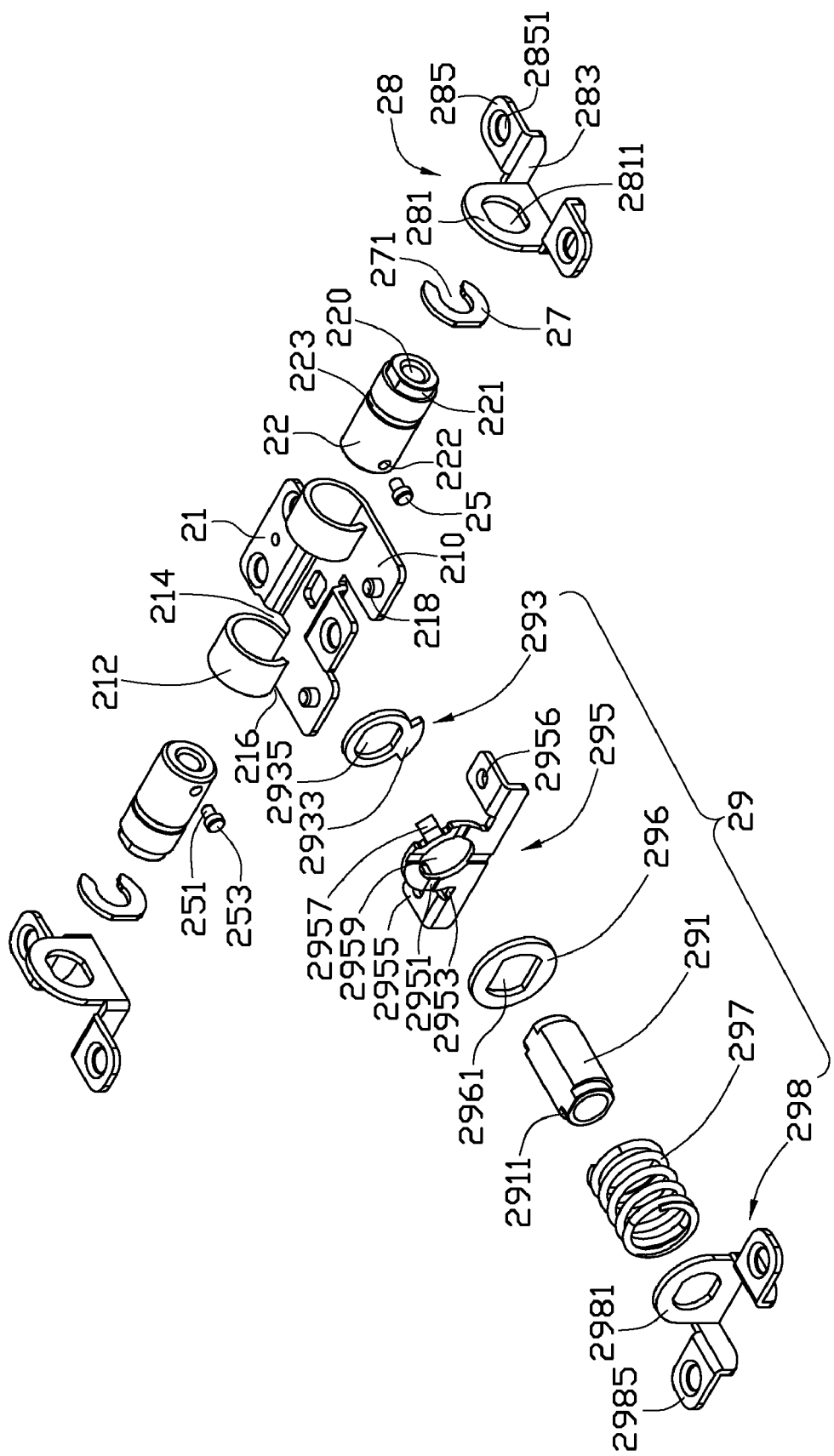
FIG. 2 is an exploded, isometric view of the swivel-hinge assembly of FIG. 1.

Referring to FIGS. 1 and 2, an embodiment of a swivel-hinge assembly 200 includes a main plate 21, a first hinge (not labeled), and a second hinge 29. The first hinge includes two first pivot shafts 22, two pegs 25, two retainers 27, and two first hinge brackets 28. The swivel-hinge assembly 200 may be used in a device such as a desk lamp. In the present exemplary embodiment, the swivel-hinge assembly 200 can be employed in a device such as a desk lamp or a flat panel display. The desk lamp includes a base and either one or two light emitting units. In the case where the desk lamp includes two light emitting units, the swivel-hinge assembly 200 interconnects the base and the light emitting units, such that each of the light emitting units is able to rotate relative to the base independently of the other light emitting unit.

The main plate 21 includes a main body 210 and a pair of knuckles 212 formed on the main body 210. The main body 210 is flat. The knuckles 212 can be formed by the following steps. Firstly, two strips are formed by cutting portions of a precursor of the main plate 21 adjacent to opposite sides of the main body 210. Secondly, free ends of the strips are curled up and around and back down towards a surface of the main body 210 to form the knuckles 212. The free end of each knuckle 212 defines a gap 216 adjacent to the main body 210. A diameter of the knuckles 212 can be adjusted according to, inter alia, the sizes of the gaps 216. The main body 210 forms two positioning protrusions 218, with each positioning protrusion 218 being adjacent to the corresponding knuckle 212.

Each first pivot shaft 22 defines a through hole 220 therein along a central axis thereof. Each first pivot shaft 22 forms a fixing portion 221 in a first end thereof, and a fixing hole 222 in an outer surface adjacent to an opposite second end thereof. The first pivot shaft 22 further defines an annular latching slot 223 at a middle portion of the outer surface thereof, to engagingly receive the retainer 27.

Each peg 25 includes a rod 251, and a limiting portion 253 formed at an end of the rod 251. A diameter of the limiting portion 253 is greater than that of the rod 251. The retainer 27 is substantially C-shaped, and has an opening 271.

Each first hinge bracket 28 includes a first latching portion 281, two connecting arms 283 perpendicularly extending from opposite edges of the first latching portion 281, and two mounting ears 285 perpendicularly extending from the connecting arms 283, respectively. The first latching portion 281 defines a latching hole 2811 corresponding to the fixing portion 221 of the first pivot shaft 22. Each mounting ear 285 defines a mounting hole 2851 in a center thereof. In the present exemplary embodiment, the two mounting ears 285 are configured to connect with one of the two light emitting units of the desk lamp.

The second hinge 29 includes a second pivot shaft 291, a limiting sheet 293, a main plate brace 295, a washer 296, an elastic member 297, and a second hinge bracket 298.

The second pivot shaft 291 is a hollow shaft. The second pivot shaft 291 forms two latching portions 2911 at two ends of an outer surface thereof, respectively. The limiting sheet 293 forms a tab 2933 on an outer circumferential edge thereof, and defines a latching hole 2935 in a center thereof. The main plate brace 295 includes a brace knuckle 2951, two extending portions 2953 extending from opposite sides of a bottom end of the brace knuckle 2951, and two fixing sheets 2955 extending from the extending portions 2953 respectively. Each fixing sheet 2955 extends substantially perpendicularly from the corresponding extending portion 2953. Each fixing sheet 2955 defines a positioning hole 2956, corresponding to one of the positioning protrusions 218. The brace knuckle 2951 forms a stopping protrusion 2957 extending perpendicularly from the outer circumferential edge thereof. The brace knuckle 2951 defines a through hole 2959 in a center thereof. A diameter of the through hole 2959 is slightly larger than that of the latching portion 2911 of the second pivot shaft 291. The washer 296 defines a latching hole 2961, corresponding to one of the latching portions 2911 of the second pivot shaft 291. The second hinge bracket 298 is substantially the same as each first hinge bracket 28. The second hinge bracket 298 includes a second latching portion 2981 for engaging with the other latching portion 2911 of the second pivot shaft 291, and a pair of mounting ears 2985. In the present exemplary embodiment, the mounting ears 2985 are mounted on the base of the desk lamp. The elastic member 297 is a coil spring.

As regards assembly of the first hinge, the following description relates to only one of the two sides of the first hinge. The knuckle 212 is slightly opened, to insert the first pivot shaft 22 into the knuckle 212. The knuckle 212 is sleeved on the first pivot shaft 22, and located between the fixing hole 222 and the annular latching slot 223. The rod 251 of the peg 25 is engaged in the fixing hole 222, with the limiting portion 253 protruding out of the first pivot shaft 22. The retainer 27 is inserted into the annular latching slot 223, to limit the knuckle 212 between the peg 25 and the retainer 27. The retainer 27 is detachable from the annular latching slot 223. The limiting portion 253 abuts an edge of the knuckle 212, restricting the movement of the knuckle 212 along the central axis of the first pivot shaft 22. When the first pivot shaft 22 is rotated toward the second hinge bracket 298, the limiting portion 253 is blocked by the main plate 21. Thus, the rotation angle range of the first pivot shaft 22 is limited. The fixing portion 221 of the first pivot shaft 22 is fixed in the latching hole 2811, thus fixing the first hinge bracket 28 to the first pivot shaft 22.

As regards assembly of the second hinge 29, one of the latching portions 2911 of the second pivot shaft 291 is inserted though the latching hole 2961 of the washer 296 and the though hole 2959 of the main plate brace 295, and engaged in the latching hole 2935. Thereby, the washer 296 and the limiting sheet 293 are fixed on the latching portion 2911 of the second pivot shaft 291. The brace knuckle 2951 is located between the washer 296 and the limiting sheet 293. The elastic member 297 is sleeved on the second pivot shaft 291. The second hinge bracket 298 is fixed on the other latching portion 2911 of the second pivot shaft 291. Opposite ends of the elastic member 297 resist the washer 296 and the second hinge bracket 298 correspondingly. When the second pivot shaft 291 is rotated, the amount of rotation is restricted by the tab 2933. In particular, when the second hinge 29 is rotated and reaches a predetermined position, the tab 2933 abuts the stopping protrusion 2957 thereby preventing further rotation of the second hinge 29. That is, the rotation angle range of the second pivot shaft 291 is limited. The positioning holes 2956 engagingly receive the positioning protrusions 218, thereby fixing the main plate brace 295 on the main plate 21.

The swivel-hinge assembly 200 includes the pegs 25 positioned at the inner ends of the first pivot shafts 22. The pegs 25 include the limiting portions 253 protruding out of the first pivot shafts 22. The limiting portions 253 abut the edges of the knuckles 212, to prevent the first pivot shafts 22 from detaching from the knuckles 212. Each first hinge bracket 28 of the swivel-hinge assembly 200 connects to one of the two light emitting units of the desk lamp, and the second hinge bracket 298 connects to the base of the desk lamp. Thereby, the position and orientation of each light emitting unit is able to be adjusted by rotating the light emitting unit about the central axis of the first pivot shaft 22 and rotating the main plate 21 about a central axis of the second pivot shaft 291. A cable of the desk lamp from the base may extend though the second pivot shaft 291 and the through hole 220 of each first pivot shaft 22, and finally connect to the corresponding light emitting units. With this arrangement, the cable can be protected from damage. Each knuckle 212 grips the corresponding first pivot shaft 22, to keep the first pivot shaft 22 steady when rotating. The knuckle 212 is partly closed, and the diameter of the knuckle 212 can be adjusted.

It is to be understood that the rod 251 of each peg 25 may be a threaded rod, and that each fixing hole 222 may be a threaded hole corresponding to the rod 251. In such case, the peg 25 is threadedly and detachably engaged in the fixing hole 222.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. A swivel-hinge assembly comprising:
a main plate;
a knuckle on the main plate,
a first pivot shaft rotatably engaged in the knuckle, at least one end of the first pivot shaft exposed out of the knuckle;
a peg positioned on the end of the first pivot shaft exposed out of the knuckle, the peg comprising a limiting portion protruding out of the first pivot shaft and abutting an edge of the knuckle, wherein when the first pivot shaft is rotated and reaches a predetermined position the limiting portion of the peg abuts the main plate thereby preventing further rotation of the first pivot shaft;
a main plate brace fixed to the main plate; and
a second pivot shaft rotatably fixed in the main plate brace.

2. The swivel-hinge assembly of claim 1, wherein the first pivot shaft defines a fixing hole in the end thereof exposed out of the knuckle, and the peg is fixed in the fixing hole.

3. The swivel-hinge assembly of claim 1, further comprising a retainer, wherein both ends of the first pivot shaft are exposed out of the knuckle, and the retainer is fixed on the other end of the first pivot shaft and abuts an opposite edge of the knuckle.

4. The swivel-hinge assembly of claim 3, wherein the first pivot shaft defines a substantially annular latching slot engagingly receiving the retainer, and the retainer is detachably engaged in the annular latching slot.

5. The swivel-hinge assembly of claim 1, wherein the second pivot shaft comprises a latching portion at an end thereof, the main plate brace defines a through hole movably receiving the latching portion therethrough, the swivel-hinge assembly further comprises a washer and a limiting sheet fixed on the latching portion, the main plate brace is located between the washer and the limiting sheet.

6. The swivel-hinge assembly of claim 5, wherein the main plate brace comprises a stopping protrusion, the limiting sheet comprises a stopping portion, and when the second pivot shaft is rotated and reaches a predetermined position, the stopping portion abuts the stopping protrusion thereby preventing further rotation of the second shaft.

7. The swivel-hinge assembly of claim 5, further comprising a bracket fixed on an opposite end of the second pivot shaft, and an elastic member sleeved on the second pivot shaft, wherein the elastic member is held between the washer and the second hinge bracket.

8. The swivel-hinge assembly of claim 1, wherein the main plate comprises a positioning protrusion, the main plate brace defines a positioning hole engagingly receiving the positioning protrusion.

9. The swivel-hinge assembly of claim 1, wherein the second pivot shaft is hollow.

* * * * *